United States Patent Office 3,363,015
Patented Jan. 9, 1968

3,363,015
OLEFINIC ISOMERS AND PROCESS FOR FORMING SAME
Edmund T. Kittleman, Bartlesville, Okla., assignor to Phillips Petroleum Company, a corporation of Delaware
No Drawing. Filed Apr. 4, 1966, Ser. No. 540,088
7 Claims. (Cl. 260—666)

ABSTRACT OF THE DISCLOSURE

Isomerization of olefinic hydrocarbons is obtained by contacting the olefin hydrocarbon with a catalyst formed on mixing molybdenum hexacarbonyl and a compound selected from the group monocarboxylic acids, beta-diketones, beta-ketoesters, beta-diesters and acid esters of the formula $(R_1—O)_2—X—OH$ wherein each R is an alkyl, cycloalkyl, aryl radical or combinations thereof and X is phosphorus, arsenic or antimony.

---

This invention relates to a process for the isomerization of olefinic compounds. In one of its aspects it relates to a novel olefinic compound which is useful in the formation of polymers. In another aspect this invention relates to a process for the isomerization of olefinic compounds which employs a novel catalyst system therein.

A wide variety of catalysts have been shown in the art to have some effectiveness for the isomerization of olefins. Within this group of catalysts, certain materials will effect the shifting of double bonds without causing skeletal rearrangement, but the activity of these catalysts is low, thus limiting conversion and yields.

It is the object of this invention to provide a new process for the isomerization of double bonds in olefinic hydrocarbons. It is a further object to provide a new catalyst system to effect such an isomerization. It is a still further object to provide a new compound, 4-ethylidenecyclohexene.

Other aspects, objects and the several advantages of this invention will be apparent from the specification and the appended claims.

According to the process of this invention, shifting of the double bonds in olefinic hydrocarbons is effected by contact with a catalyst formed on admixing molybdenum hexacarbonyl and a second compound, the mole ratio of the second compound to molybdenum hexacarbonyl being in the range of from about 0.5 to about 100.

In a preferred aspect of this invention, 4-vinylcyclohexene is isomerized to 4-ethylidenecyclohexene, the latter compound being a new composition of matter.

A wide variety of second compounds can be used in conjunction with molybdenum hexacarbonyl in the isomerization process of this invention. Suitable compounds which can be employed include monocarboxylic acid, beta diketones, beta ketoesters, beta cyanoesters, and beta diesters generally containing from 2 to about 18 carbon atoms and acid esters having the general formula $$(R_1—O)_2—X—OH$$

wherein each $R_1$ is selected from the group consisting of alkyl, cycloalkyl, aryl, and combinations of these such as aralkyl and alkaryl, having from 1 to 10 carbon atoms, inclusive, and X is selected from the group consisting of phosphorus, arsenic or antimony. Specific compounds within these groups which can be employed are acetic acid, propionic acid, butyric acid, benzoic acid, pentanoic acid, octanoic acid, stearic acid, acetylacetone, 2,4-hexanedione, 3,5-heptanedione, 4,6-decanedione, ethyl acetoacetate, methyl acetoacetate, phenyl acetoacetate, ethyl cyanoacetate, 3-oxa-4,6-hendecanedione, diethylmalonate, dimethyl malonate, phenyl methyl malonate, butyl n-propyl malonate, dimethylphosphite, di-n-butylphosphite, diphenylphosphite, dibenzylcarsenite, diethylstibonite, di-p-tolylstibonite, and the like. It has been found that smaller amounts of the acid phosphites, arsenites, and stibonites can be efficiently used than in the case of the other acidic compounds.

The isomerization process of this invention is broadly applicable to the shifting of double bonds in olefinic hydrocarbons, including monoolefinic hydrocarbons and hydrocarbons containing multiple double bonds. The olefinic hydrocarbons can be cyclic or acyclic and can contain from 4 to about 20 carbon atoms per molecule. As will be shown hereinafter, the process is advantageously applicable to the isomerization of alkenyl-substituted cycloolefins, particularly 4-vinylcyclohexene. The isomerization of 4-vinylcyclohexene by the process of this invention yields 4-ethylidenecyclohexene.

As stated previously, the mole ratio of second compound to molybdenum hexacarbonyl should be at least 0.5/1 and can range as high as 100/1. The mole ratio of $Mo(CO)_6$/olefinic compound will generally fall within the range of from 0.001 to 0.1, while the reaction temperature will generally fall within the range from 100 to 300° C. The reaction can be carried out in either the presence or absence of an inert diluent. Reaction times will generally extend from a few minutes to 24 hours, although longer times can be used if desired. By operating within the prescribed ranges, one skilled in the art can determine, for example, the optimum conditions for producing optimum amounts of 4-ethylidenecyclohexene, if 4-vinylcyclohexene is the olefin being isomerized. It is recognized that the 4-ethylidenecyclohexene can isomerize to other materials during extremely long reaction times or at other conditions such as at extremely low acid ratios.

This material can be used as a termonomer in ethylene/propylene rubber or it can be employed as an intermediate in the synthesis of other useful compounds. For example, reaction of 4-ethylidenecyclohexene with HCl will result in the addition of 1 mole of HCl to the ethylidene group with the chlorine atom being attached to the tertiary carbon to form 4-chloro-4-ethylcyclohexene. Epoxidation of 4-ethylidenecyclohexene can be carried out in a manner so as to obtain the monoepoxide or diepoxide if desired. These oxirane compounds are useful in the formation of polyesters and similar materials.

The following specific examples are intended to illustrate the advantages of the process of this invention, but it is not intended that the invention be limited to the specific features shown.

Example I 1-octene was isomerized to internal octenes in the following manner. Twenty-five ml. of 1-octene in admixture with 25 ml. of glacial acetic acid and 3.3 grams of molybdenum hexacarbonyl were refluxed under nitrogen for 5 hours. The acid/molybdenum hexacarbonyl mole ratio was 33/1. Analysis of the reaction mixture indicated an almost complete isomerization to internal octenes.

Similar results were obtained at a 2/1 benzoic acid/molybdenum hexacarbonyl mole ratio. In this run, 25 ml. of 1 octene, 25 ml. of chloroform, 3.66 grams of benzoic acid and 3.6 grams of molybdenum hexacarbonyl were refluxed overnight. GLC analysis of the reaction mixture indicated almost complete isomerization to internal octenes.

Example II

A run was carried out in which 1,5-cyclooctadiene was isomerized to 1,3-cyclooctadiene by refluxing over molybdenum hexacarbonyl and glacial acetic acid. In this run, 50 ml. of 1,5-cyclooctadiene, 50 ml. of glacial acetic acid and 6.6 grams of molybdenum hexacarbonyl was refluxed under nitrogen for 6 hours. The acid/molybdenum compound mole ratio was 33/1. Analysis of the reaction mixture showed that the reaction mixture contained 75 weight percent 1,3-cyclooctadiene and 20 weight percent of 1,5-cyclooctadiene.

*Example III*

3.3 grams of molybdenum hexacarbonyl, 50 ml. of propionic acid and 50 ml. of VCH was refluxed for 3 hours. The acid/molybdenum mole ratio was 53/1. GLC analysis of the reaction mixture after 3 hours showed 25 weight percent of isomeric $C_8$ material present and 75 weight percent unchanged $C_8$. Reflux was then continued over the weekend, after which GLC analysis showed the presence of 58 percent of $C_8$ isomers and 45 weight percent of unchanged VCH.

*Example IV*

A mixture of 50 ml. of vinylcyclohexene, 50 ml. of diglyme, 50 ml. of n-octanoic acid and 3.3 grams of molybdenum hexacarbonyl was refluxed for 2.5 hours under nitrogen atmosphere. A GLC analysis of the reaction mixture showed the presence of 45 weight percent isomeric $C_8$ materials and 55 weight percent of unchanged VCH.

*Example V*

A run was carried out in which 250 ml. of vinylcyclohexene (200 grams), 250 ml. of glacial acetic acid, 250 ml. of diglyme and 13.2 grams of molybdenum hexacarbonyl was refluxed overnight under a nitrogen atmosphere. The mole ratio of acid/molybdenum compound was 83/1. GLC analysis of the reaction mixture showed the presence of 50 weight percent of unchanged VCH and 45 weight percent of isomeric $C_8$ compound. This material was then fractionated on a Todd column from which was isolated 33 grams of a material having a boiling point of 139–140° C. Analysis of this material by nuclear magnetic resonance showed that the material was 4-ethylidenecyclohexene.

*Example VI*

In a run similar to that of the preceding Example V, 4-vinylcyclohexene (2.4 moles) was mixed with molybdenum hexacarbonyl (0.01 mole) and diphenyl phosphite (0.04 mole). The mixture was heated and refluxed under a nitrogen atmosphere for 9.5 hours. Simple distillation of this reaction mixture yielded a 94 percent recovery of $C_8$ compounds. Of these, 81.4 weight percent was 3-ethylidenecyclohexene and 15.7 weight percent was 4-ethylidenecyclohexene. The remainder was principally a small amount of unconverted 4-vinylcyclohexene.

The above examples clearly demonstrate that isomerization of olefinic compounds is achieved by contacting the olefinic hydrocarbon with a catalyst formed on admixing molybdenum hexacarbonyl and an acidic compound.

The GLC (gas-liquid-chromatography) analyses employed herein were carried out using a Perkin-Elmer Vapor Fractometer Model 154 using a 20 ft. column which was packed with a conventional support (Chromasorb) containing 15 weight percent triscyanoethoxypropane (TCE). The analysis was carried out at 110° C. using helium carrier gas.

The NMR (Nuclear Magnetic Resonance) procedures as employed herein are generally described and discussed in:

(1) L. M. Jackman, "Application of Nuclear Magnetic Resonance of Spectroscopy in Organic Chemistry," London; New York Pergammon Press (1959).

(2) Pople, Schneider, Bernstein, "High Resolution Nuclear Magnetic Resonance," New York, McGraw-Hill (1959).

Reasonable variations and modifications are possible within the scope of this disclosure without departing from the spirit and scope of the invention.

I claim:
1. A process for the isomerization of double bonds in an olefinic hydrocarbon having 4 to 20 carbon atoms per molecule which comprises contacting said hydrocarbon with a catalyst formed on admixing molybdenum hexacarbonyl and an acidic compound selected from the group consisting of monocarboxylic acids containing from 2 to 18 carbon atoms and acid esters having the general formula $(R_1-O)_2-X-OH$ wherein each $R_1$ is selected from the group consisting of alkyl, cycloalkyl, aryl, and combinations of these such as aralkyl and alkaryl, having from 1 to 10 carbon atoms, inclusive, and X is selected from the group consisting of phosphorus, arsenic or antimony, wherein the mole ratio of said molybdenum hexacarbonyl to said olefinic hydrocarbon is in the range of 0.001:1 to 0.1:1, the mole ratio of said second compound to molybdenum hexacarbonyl is in the range of 0.5:1 to 100:1 and the reaction temperature is in the range of 100 to 300° C.

2. A process according to claim 1 wherein said second compound is selected from the group of acetic acid, propionic acid, butyric acid, benzoic acid, pentanoic acid, octanoic acid, stearic acid, dimethylphosphite, di-n-butylphosphite, diphenylphosphite, dibenzylarsenite, diethylstibonite and di-p-tolylstibonite.

3. A process according to claim 1 wherein said olefinic hydrocarbon is selected from the group consisting of 1-octene, 1,5-cyclooctadiene and vinylcyclohexene.

4. A process according to claim 1 wherein said olefinic compound is 4-vinylcyclohexene, and said second compound is glacial acetic acid.

5. A catalyst composition consisting of a mixture of molybdenum hexacarbonyl and an acidic compound selected from the group consisting of monocarboxylic acids containing from 2 to 18 carbon atoms and acid esters of the formula $(R_1-O)_2-X-OH$ wherein $R_1$ is selected from the group consisting of alkyl, cycloalkyl, aryl radicals and combinations thereof having from 1 to 10 carbon atoms and X is selected from the group consisting of phosphorus, arsenic and antimony wherein the mole ratio of the second compound to molybdenum hexacarbonyl is in the range of 0.5:1 to 100:1.

6. A catalyst system according to claim 5 consisting of a mixture of molybdenum hexacarbonyl and an acidic compound of the group of acetic acid, propionic acid, butyric acid, benzoic acid, pentanoic acid, octanoic acid, stearic acid, dimethylphosphite, di-n-butylphosphite, diphenylphosphite, dibenzylcarsenite, diethylstibonite and di-p-tolylstibonite.

7. A composition according to claim 5 wherein said acidic compound is selected from the group consisting of acetic acid, benzoic acid, propionic acid, n-octanoic acid and diphenylphosphite.

References Cited

UNITED STATES PATENTS

| | | | |
|---|---|---|---|
| 3,139,460 | 6/1964 | Eisenmann | 260—683.2 |
| 1,876,270 | 9/1932 | Zorn | 252—431 |
| 2,840,617 | 6/1958 | Shokal | 252—431 |
| 3,065,250 | 11/1962 | Levering | 252—431 |
| 3,080,432 | 3/1963 | Voltz et al. | 260—666 |
| 3,083,246 | 3/1963 | Holzman | 260—683.150 |
| 3,102,899 | 9/1963 | Cannell | 252—431 |
| 3,152,131 | 10/1964 | Heberling | 252—431 |
| 3,320,294 | 5/1967 | Larson | 252—431 |
| 3,326,949 | 6/1967 | Larson | 252—431 |

OTHER REFERENCES

Faraday's Encyclopedia of Hydrocarbon Compounds, $C_8H_6$—14. Cheminder Ltd. volume 3A, Butterworths Scientific Publication, 1958, p. 08065.00.11.

DELBERT E. GANTZ, *Primary Examiner.*

V. O'KEEFE, *Assistant Examiner.*